United States Patent
Kashyap

(10) Patent No.: US 8,769,676 B1
(45) Date of Patent: Jul. 1, 2014

(54) TECHNIQUES FOR IDENTIFYING SUSPICIOUS APPLICATIONS USING REQUESTED PERMISSIONS

(75) Inventor: Anand Kashyap, San Jose, CA (US)

(73) Assignee: Symantec Corporation, Mountain View, CA (US)

(*) Notice: Subject to any disclaimer, the term of this patent is extended or adjusted under 35 U.S.C. 154(b) by 181 days.

(21) Appl. No.: 13/335,727

(22) Filed: Dec. 22, 2011

(51) Int. Cl.
*G06F 11/00* (2006.01)
(52) U.S. Cl.
USPC .......................................................... 726/22
(58) Field of Classification Search
USPC .......................................................... 726/22
See application file for complete search history.

(56) References Cited

U.S. PATENT DOCUMENTS

| | | | |
|---|---|---|---|
| 2010/0077476 A1* | 3/2010 | Adams | 726/22 |
| 2010/0235915 A1* | 9/2010 | Memon et al. | 726/23 |
| 2011/0283361 A1* | 11/2011 | Perdisci et al. | 726/24 |

\* cited by examiner

*Primary Examiner* — Teshome Hailu
*Assistant Examiner* — Abiy Getachew
(74) *Attorney, Agent, or Firm* — Wilmer Cutler Pickering Hale and Dorr LLP

(57) ABSTRACT

Techniques for identifying suspicious applications are disclosed. In one particular exemplary embodiment, the techniques may be realized as a method for identifying suspicious applications comprising determining one or more clusters of applications in an identified category of applications based on requested permissions of each of two or more applications in each of the one or more clusters of applications, determining a center application of each of the one or more clusters, and determining, using at least one computer processor, a similarity score for an application being evaluated based at least in part on a distance between the application being evaluated and the center application of a closest cluster of the one or more clusters.

19 Claims, 7 Drawing Sheets

TECHNIQUES FOR IDENTIFYING SUSPICIOUS APPLICATIONS USING REQUESTED PERMISSIONS

FIELD OF THE DISCLOSURE

The present disclosure relates generally to system security and, more particularly, to techniques for identifying suspicious applications using requested permissions.

BACKGROUND OF THE DISCLOSURE

Downloading of applications is prevalent and is increasing. In particular, the number of applications for mobile devices such as Android™ based devices is increasing. Many applications available for download contain a digital certificate from a developer of the application itself and not a central signing authority. There may be little a user can do to evaluate the security and safety of an application prior to paying for the application, downloading the application, and installing it.

In view of the foregoing, it may be understood that there may be significant problems and shortcomings associated with current suspicious application identification technologies.

SUMMARY OF THE DISCLOSURE

Techniques for identifying suspicious applications are disclosed. In one particular exemplary embodiment, the techniques may be realized as a method for identifying suspicious applications comprising determining one or more clusters of applications in an identified category of applications based on requested permissions of each of two or more applications in each of the one or more clusters of applications, determining a center application of each of the one or more clusters, and determining, using at least one computer processor, a similarity score for an application being evaluated based at least in part on a distance between the application being evaluated and the center application of a closest cluster of the one or more clusters.

In accordance with other aspects of this particular exemplary embodiment, the identified category may comprise a category specified by a mobile application distributor for the application being evaluated.

In accordance with further aspects of this particular exemplary embodiment, determining one or more clusters of applications may be performed using hierarchical clustering.

In accordance with additional aspects of this particular exemplary embodiment, determining one or more clusters of applications may be performed using K-means clustering.

In accordance with additional aspects of this particular exemplary embodiment, the distance between the application being evaluated and the center application of the closest cluster may be computed using a hamming distance.

In accordance with additional aspects of this particular exemplary embodiment, the hamming distance may be computed between a bit vector of a requested permission set of the application being evaluated and a bit vector of a requested permission set of the center application of the closest cluster.

In accordance with additional aspects of this particular exemplary embodiment, the distance between the application being evaluated and the center application of the closest cluster may be computed using a Euclidean distance.

In accordance with additional aspects of this particular exemplary embodiment, the distance between the application being evaluated and the center application of the closest cluster may be computed using a Jaccard distance.

In accordance with additional aspects of this particular exemplary embodiment, applications in the one or more clusters of applications in an identified category of applications may comprise applications in an online application store.

In accordance with additional aspects of this particular exemplary embodiment, the requested permissions of each of the two or more applications in each of the one or more clusters of applications may be obtained using a manifest file of each of the two or more applications.

In accordance with additional aspects of this particular exemplary embodiment, the requested permissions of each of the two or more applications may be filtered prior to determination of a cluster to exclude from consideration permissions which occur in less than a specified number of applications.

In accordance with additional aspects of this particular exemplary embodiment, the techniques may further comprise converting the similarity score for the application being evaluated into an application score.

In accordance with additional aspects of this particular exemplary embodiment, the application score may increase as the similarity score based at least in part on a distance between the application being evaluated and the center application of a closest cluster decreases.

In accordance with additional aspects of this particular exemplary embodiment, the conversion of the similarity score to the application score may be based at least in part on a clustering algorithm used to determining the one or more clusters of applications.

In accordance with additional aspects of this particular exemplary embodiment, the conversion of the similarity score to the application score may be based at least in part on a distance algorithm used to determining the distance between the application being evaluated and the center application of the closest cluster of the one or more clusters.

In accordance with additional aspects of this particular exemplary embodiment, one or more actions may be performed in response to a determination that the application has an application score below a specified threshold.

In accordance with additional aspects of this particular exemplary embodiment, one or more actions may comprise at least one of: performing static analysis of the application, performing behavioral analysis of the application, performing reputation based analysis of the application, blacklisting the application, and blocking the application.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for identifying suspicious applications, the article of manufacture comprising at least one non-transitory processor readable storage medium, and instructions stored on the at least one storage medium, wherein the instructions are configured to be readable from the at least one storage medium by at least one processor and thereby cause the at least one processor to operate so as to determine one or more clusters of applications in an identified category of applications based on requested permissions of each of two or more applications in each of the one or more clusters of applications, determine a center application of each of the one or more clusters, and determine a similarity score for an application being evaluated based at least in part on a distance between the application being evaluated and the center application of a closest cluster of the one or more clusters.

In yet another particular exemplary embodiment, the techniques may be realized as a system for identifying suspicious applications comprising one or more processors communicatively coupled to a network; wherein the one or more processors are configured to determine one or more clusters of applications in an identified category of applications based on requested permissions of each of two or more applications in each of the one or more clusters of applications, determine a center application of each of the one or more clusters, and determine a similarity score for an application being evaluated based at least in part on a distance between the application being evaluated and the center application of a closest cluster of the one or more clusters.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
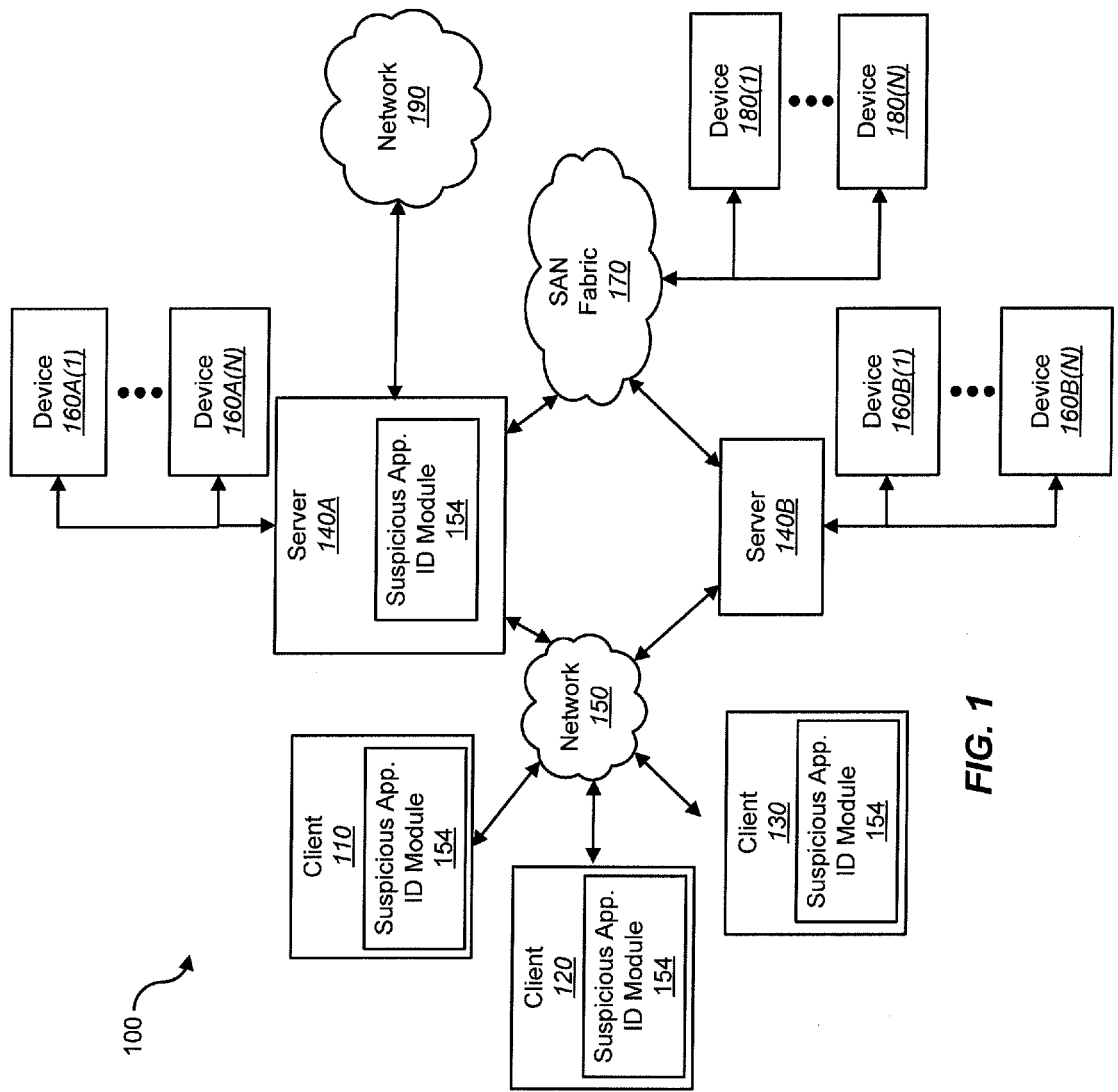
FIG. 1 shows a block diagram depicting a network architecture for identifying suspicious applications in accordance with an embodiment of the present disclosure.

FIG. 1 shows a block diagram depicting a network architecture 100 for identifying suspicious applications in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., suspicious application identification module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
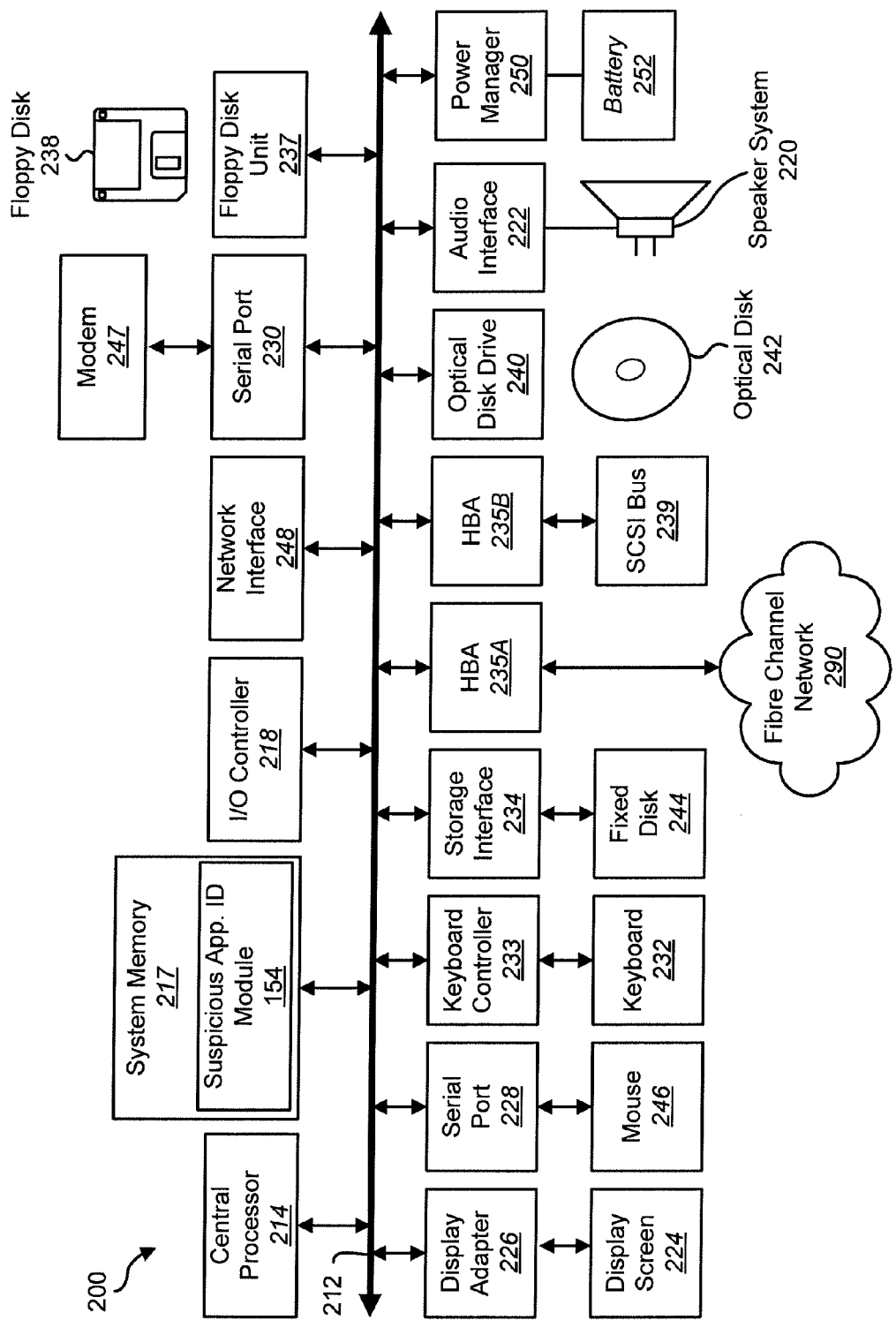
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for identification of suspicious applications such as, for example, suspicious application identification module 154. As illustrated, one or more portions of suspicious application identification module may reside at a network centric location. For example, server 140A may be a server, a firewall, a gateway, or other network element that may perform one or more actions to identify a suspicious application. According to some embodiments, network 190 may be an external network (e.g., the Internet) and server 140A may be a gateway or firewall between one or more internal components and clients and the external network.

Analysis of applications may occur at different times or based on different triggering events. For example, an application may be analyzed and/or rated prior to posting in an app store, subsequent to posting in an app store, after receiving a download request, a receiving a certain number of download requests, after being received at a gateway, after being received at a client, after being requested by a client, in response to a client rating request, or at another time.

According to some embodiments, suspicious application identification module 154 may identify suspicious applications by sampling manifest files of applications at online site offering downloadable applications. Online sites may include an app store such as, for example Android Market™ hosted by Google™ and the Amazon Android App Store™. Downloadable applications may request permissions in a manifest file contained in the downloadable application. Permissions may be declarations of intent to access protected data or resources of an operating system, a device, or another application. An application may declare permissions requested for the application in a manifest file. A user may be prompted for consent when installing an application. An application in an app store may be categorized by the app store, publisher, or by the developer when providing the app to the app store. Examples may include: Angry Birds which may be classified in a category of "Arcade & Action" and may request access permissions of at least "INTERNET"; Kindle which may be classified in a category of "Books & Reference" and may request access permissions of at least "INTERNET", "READ_PHONE_STATE", "WRITE_EXTERNAL_STORAGE", "ACCESS_WIFI_STATE", and "ACCESS_NETWORK_STATE"; and Skype which may be classified in a category of "Communication" and may request access permissions of at least "INTERNET", "READ_CONTACTS", "WRITE_CONTACTS", "GET_TASKS", "ACCESS_COARSE_LOCATION", "RECORD_AUDIO", and "WAKE_LOCK".

Figure 6:
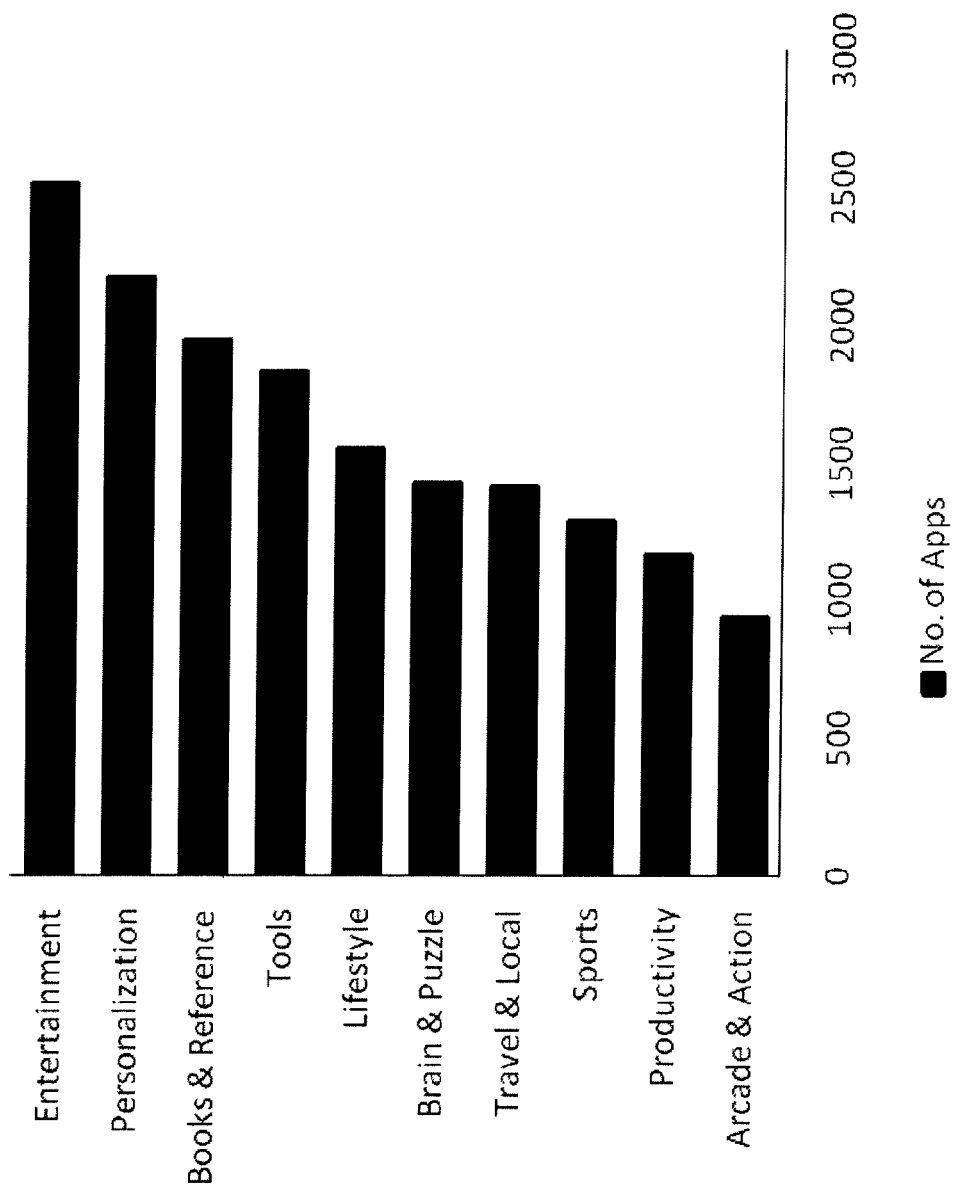
FIG. 6 depicts a bar graph of exemplary categories of popular applications in accordance with an embodiment of the present disclosure.

An exemplary sample of popular application categories and a number of applications in these categories is depicted in FIG. 6.

Figure 7:
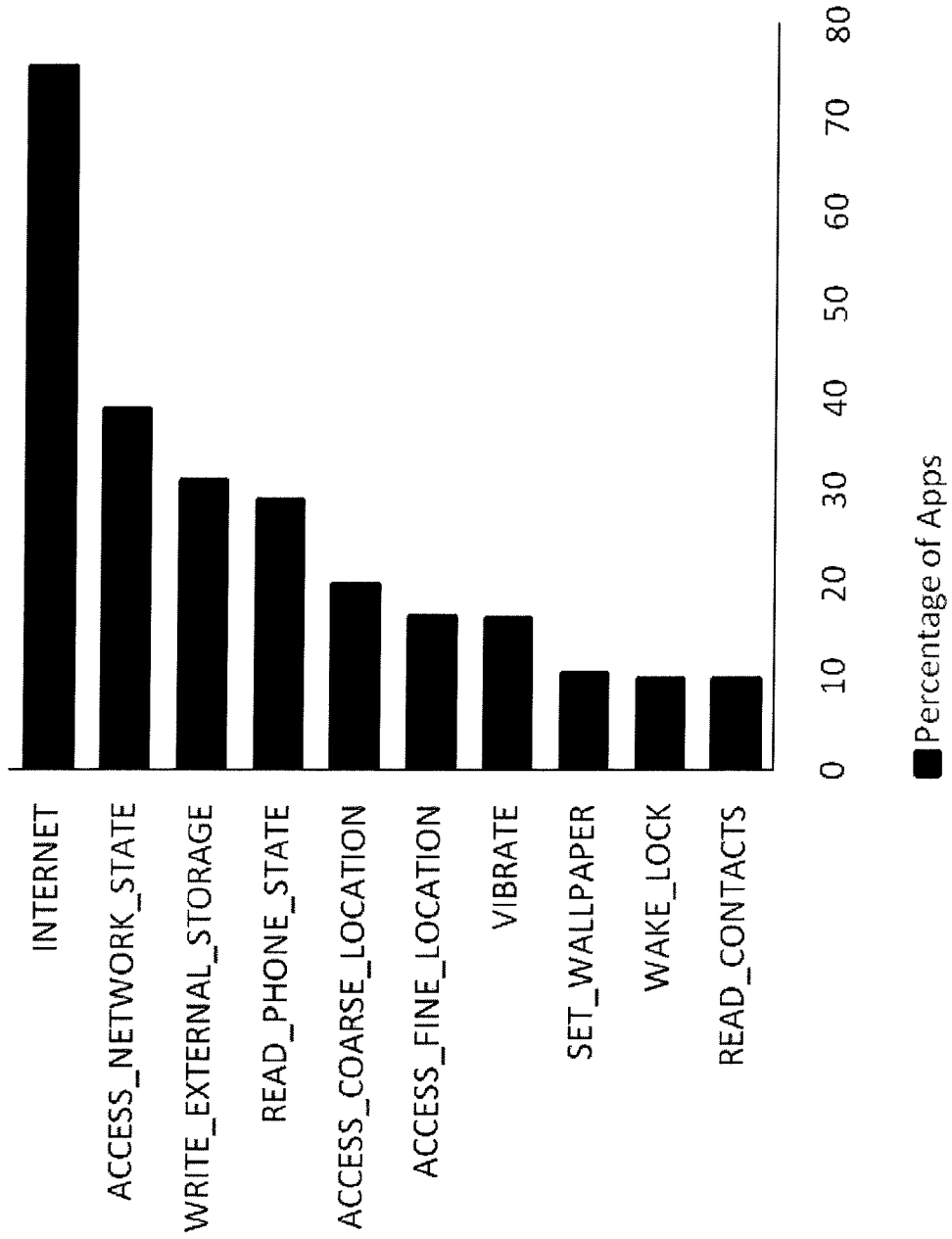
FIG. 7 depicts a bar graph of exemplary percentages of popular requested application permissions in accordance with an embodiment of the present disclosure.

An exemplary sample of popular requested access permissions and a percentage of requesting applications are depicted in FIG. 7.

Referring again to FIG. 1, suspicious application identification module 154 may attempt to provide a rating or score of applications based on the similarity of their requested permission in comparison to other applications in their category. In some embodiments, a similarity of requested permissions of an application to other applications in a same category may provide an indication of safety of the application. An anomaly in requested permissions of an application may indicate a security risk or malware. According to some embodiments, a majority of applications may be assumed to be legitimate, safe applications, and it may be assumed that applications in a same category may be similar in scope and intentions.

In one or more embodiments, malware samples may be used. Suspicious application identification module 154 may provide a rating of an application based on a claimed category of an application and a similarity of requested permissions to a malware sample (e.g., a misleading application or Trojan horse).

According to some embodiments, one or more portions of suspicious application identification module 154 be present at one or more servers hosting an app store and may provide a rating of hosted applications. According to some embodiments, one or more portions suspicious application identification module 154 may be present on a gateway or firewall and may filter applications or provide other actions based on an application rating. One or more portions of suspicious application identification module 154 may be present on a client and may rate applications available for download or perform one or more actions based on a rating of an application.

In some embodiments, a software provider, a network security provider, an apps publisher, an apps marketplace host, or another party may use suspicious application identification module 154 to rate one or more applications.

Figure 5:
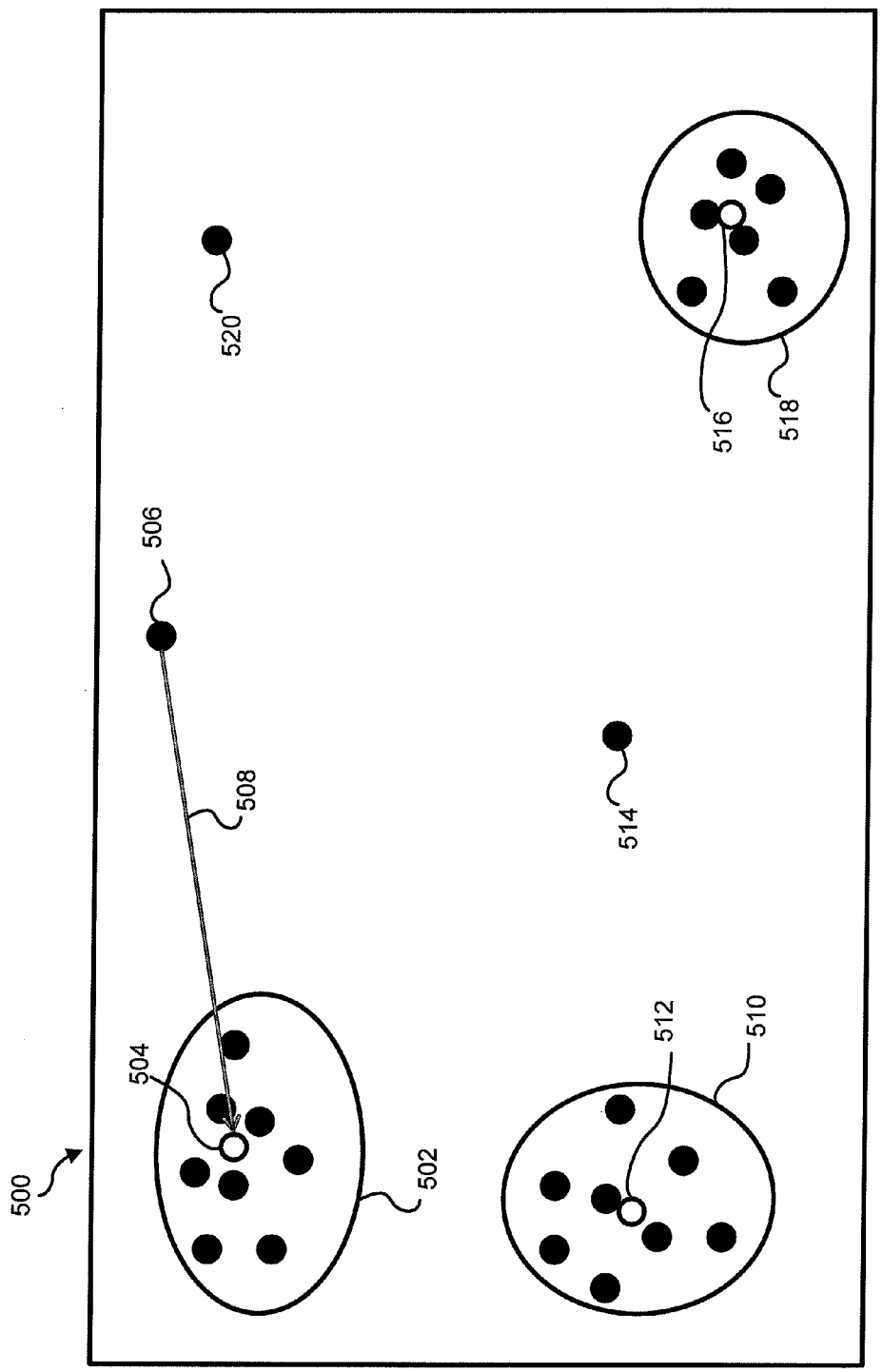
FIG. 5 depicts a diagram for determining a similarity score of an application in accordance with an embodiment of the present disclosure.

Referring to FIG. 5, there is depicted a diagram for determining a similarity score of an application in accordance with an embodiment of the present disclosure. As depicted in diagram 500 each of the circles 506, 520, and 514 may represent applications being analyzed or rated. The circles inside clusters 502, 510, and 518 may represent applications in a cluster. All of the applications depicted in diagram 500 may be in a single category. Application 504 may be a centroid or prototype of cluster 502. Application 512 may be a centroid or prototype of cluster 510. Application 512 may be a centroid or prototype of cluster 518.

According to some embodiments, clusters 502, 510, and 518 may be determined by examining feature vectors of each of the applications. A feature vector of an application may be a set of application permissions extracted from a manifest file associated with the application. According to some embodiments, permissions that are custom to an application or that occur in less than a specified number of applications (e.g., less than five applications) may be omitted from consideration. A feature vector may be a bit vector or other data structure representing permissions.

$$x = \Sigma a_i x_i, (a_i = 1/0 \text{ if permission } x_i \text{ is present/absent})$$

$$X = \{x_i | \text{permission } x_i \text{ is present}\}$$

According to some embodiments, suspicious application identification module 154 of FIG. 1 or 2 may extract one or more manifest files and analyze them to create feature vectors for applications.

Once feature vectors have been constructed applications in a category may be arranged into clusters of applications with similar permissions. An application may be determined to be in a cluster by a similarity of a score of an applications feature vector of requested permissions with its nearest cluster. One or more different clustering algorithms may be used.

According to some embodiments, a K-Means algorithm may be used to determining clustering and prototype or centroid selection. In embodiments using a K-Means Algorithm the computation may be performed a plurality of times and the number of clusters input may be varied from 1 to 5. The iteration with the smallest similarity index may be chosen.

According to some embodiments, prototype based hierarchical clustering analysis may be used to determine the clusters. The number of clusters may be dependent upon the data. Prototypes of a cluster may be computed as part of the algorithm. A distance metric may be used to create or calculate clusters (e.g., by determining the distance between bit vectors of permission sets of two applications) during K-means clustering analysis, prototype based hierarchical clustering analysis, or other clustering algorithms.

According to some embodiments, suspicious application identification module 154 of FIG. 1 or 2 may perform clustering analysis and identify prototypes 504, 512, and 516 for the clusters 502, 510, and 518, respectively.

Once clusters have been determined, a new application being analyzed may be compared to one or more clusters using a distance metric. A distance metric may use a distance between a bit vector of a permission set of an application being analyzed and a bit vector of a permission set of a prototype or centroid of a nearest cluster. One or more distance measurement algorithms may be used. These distance algorithms may also be used in the above discussed clustering analysis.

According to some embodiments, a hamming distance may be calculated. For example, the distance may be calculated as:

$$D(X,Y)=|X \cup Y|-|X \cap Y|$$

According to some embodiments, a normalized Euclidean distance algorithm may be used. According to one more embodiments, a Jaccard distance algorithm may be used. For example, the distance may be calculated as:

$$D(X,Y)=1-|X \cap Y|/|X \cup Y|$$

Once a distance between the requested permission set vector of the application being analyzed and the requested permission set vector of the prototype application of the nearest cluster is calculated, the distance may be the similarity score of the application being analyzed. The similarity score may be converted to an application score. According to some embodiments (e.g., embodiments in which the prototype of the closest cluster is presumed to be a good application), the smaller the similarity score or distance, the higher the application score may be. According to some embodiments (e.g., embodiments in which the prototype of the closest cluster is known to be malware), the larger the similarity score or distance, the higher the application score may be.

According to some embodiments, suspicious application identification module 154 of FIG. 1 or 2 may perform calculation of similarity scores and conversion of similarity scores to application scores.

Conversion from a similarity score to an application score may depend on one or more of a clustering algorithm used, a distance metric chosen, and other analysis factors.

Analysis of downloadable applications using requested permission may be performed without downloading or purchasing an application. This may allow for analysis of applications in an app store and may be used as a first level filter for deeper analysis (e.g., static analysis, dynamic analysis, reputation based analysis, etc.).

According to some embodiments, further analysis may be performed on permissions requested by applications. For example, groups of applications intending to perform a shared exploit using a complementary set of permissions may be identified. According to some embodiments, these applications may be identified by applications that contain outlier permissions that in combination present a threat of a shared exploit.

In some embodiments, known good applications which contain anomalous permissions may be white-listed to improve accuracy. In one or more embodiments, permission bitmaps may be used as signatures to identify common or similar developers.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, suspicious application identification module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptible Power Supply (UPS) located either local to or remote from computer system 200. In such embodiments, power manager 250 may provide information about a power level of an UPS.

Figure 3:
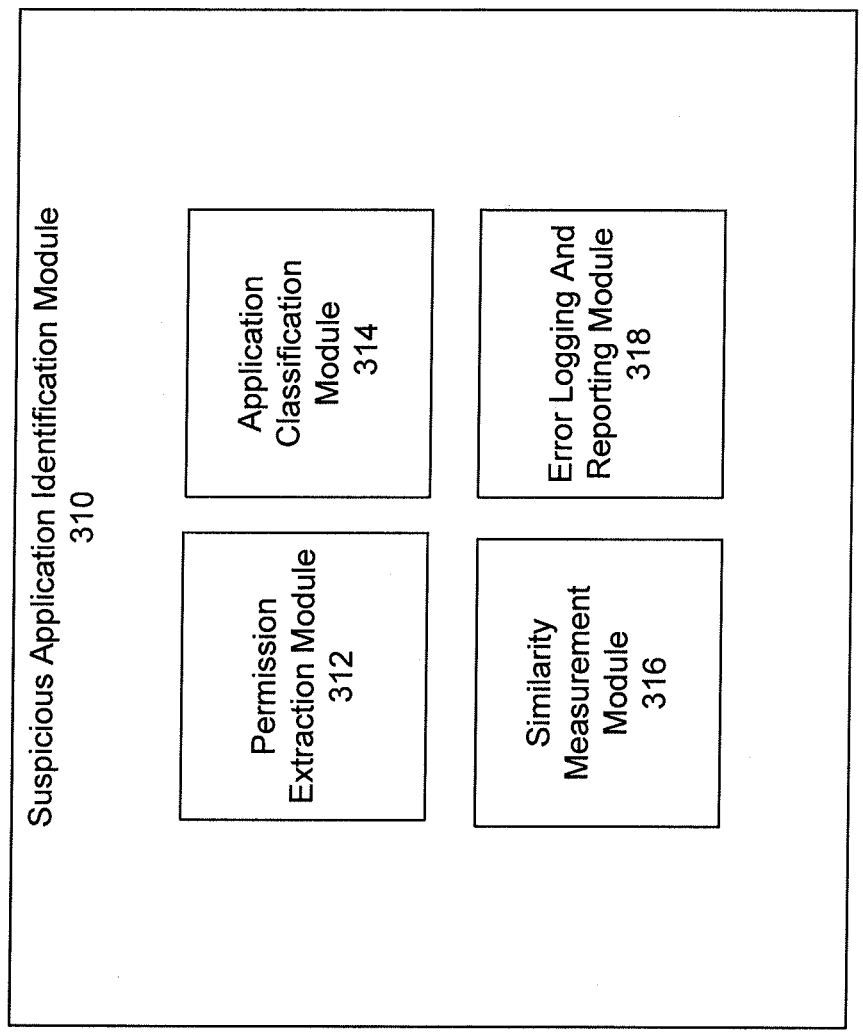
FIG. 3 shows a module for identifying suspicious applications in accordance with an embodiment of the present disclosure.

Referring to FIG. 3, there is shown a suspicious application identification module 310 in accordance with an embodiment of the present disclosure. As illustrated, the suspicious application identification module 310 may contain one or more components including permission extraction module 312, application classification module 314, similarity measurement module 316, and error logging and reporting module 318.

The description below describes network elements, computers, and/or components of a system and method for identifying suspicious applications that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Permission extraction module 312 may extract requested permissions from one or more downloadable applications. Downloadable applications may request permissions in a manifest file contained in the downloadable application. Permissions may be declarations of intent to access protected data or resources of an operating system, a device, or another application. Examples of requested permissions may include, but are not limited to: "INTERNET", "READ_PHONE_STATE", "WRITE_EXTERNAL_STORAGE", "ACCESS_WIFI_STATE", "ACCESS_NETWORK_STATE", "READ_CONTACTS", "WRITE_CONTACTS", "GET_TASKS", "ACCESS_COARSE_LOCATION", "RECORD_AUDIO", and "WAKE_LOCK". Permission extraction module 312 may generate feature vectors or bit vectors of requested permissions for one or more applications.

Application classification module 314 may arrange applications in a category into clusters of applications with similar permissions. An application may be determined to be in a cluster by a similarity of a score of an applications feature vector of requested permissions with its nearest cluster. One or more different clustering algorithms may be used. According to some embodiments, a K-Means algorithm may be used to determining clustering and prototype or centroid selection. In embodiments using a K-Means Algorithm the computation may be performed a plurality of times and the number of clusters input may be varied from 1 to 5. The iteration with the smallest similarity index may be chosen. According to some embodiments, prototype based hierarchical clustering analysis may be used to determine the clusters. The number of clusters may be dependent upon the data. Prototypes of a cluster may be computed as part of the algorithm. A distance metric may be used to create or calculate clusters (e.g., by determining the distance between bit vectors of permission sets of two applications) during K-means clustering analysis, prototype based hierarchical clustering analysis, or other clustering algorithms.

Similarity measurement module 316 may analyze an application under consideration with respect to one or more clusters of applications using a distance metric. A distance metric may use a distance between a bit vector of a permission set of an application being analyzed and a bit vector of a permission set of a prototype or centroid of a nearest cluster. One or more distance measurement algorithms may be used. These distance measurement algorithms may also be used during clustering analysis.

According to some embodiments, a hamming distance may be calculated. For example, the distance may be calculated as:

$$D(X,Y)=|X \cup Y|-|X \cap Y|$$

According to some embodiments, a normalized Euclidean distance algorithm may be used. According to one more embodiments, a Jaccard distance algorithm may be used. For example, the distance may be calculated as:

$$D(X,Y)=1-|X \cap Y|/|X \cup Y|$$

Once a distance between the requested permission set vector of the application being analyzed and the requested permission set vector of the prototype application of the nearest cluster is calculated, the distance may be the similarity score of the application being analyzed. The similarity score may be converted to an application score. According to some embodiments (e.g., embodiments in which the prototype of the closest cluster is presumed to be a good application), the smaller the similarity score or distance, the higher the application score will be. According to some embodiments (e.g., embodiments in which the prototype of the closest cluster is known to be malware), the larger the similarity score or distance, the higher the application score may be.

According to some embodiments, similarity measurement module 316 may also perform the conversion of a similarity measurement to an application score. Conversion from a similarity score to an application score may depend on one or more of a clustering algorithm used, a distance metric chosen, and other analysis factors.

Error logging and reporting module 318 may produce logs, reports, or other information associated with identifying suspicious applications.

Figure 4:
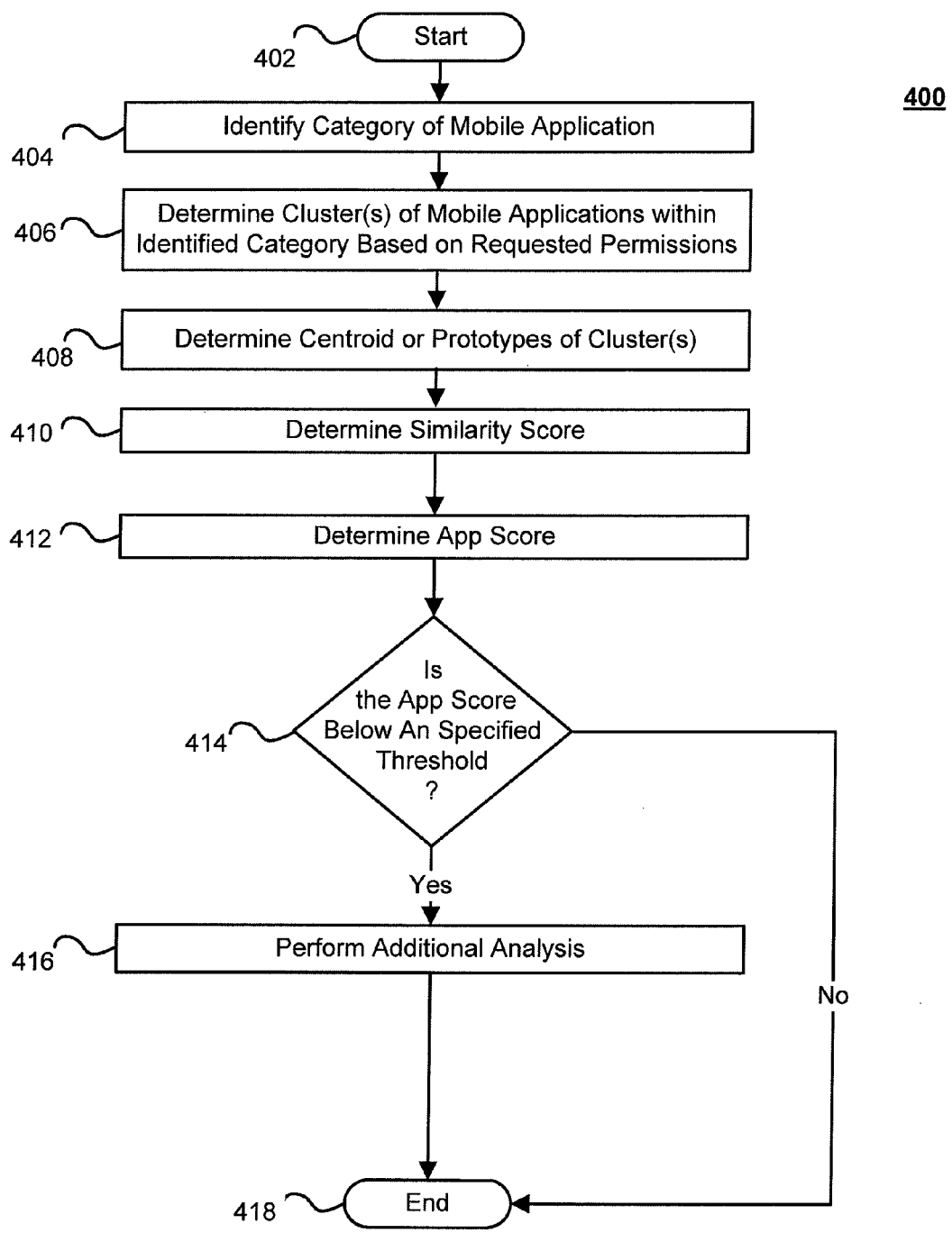
FIG. 4 depicts a method for identifying suspicious applications in accordance with an embodiment of the present disclosure.

Referring to FIG. 4, there is depicted a method 400 for identifying suspicious applications in accordance with an embodiment of the present disclosure. At block 402, the method 400 may begin.

At block 404, a category of a mobile application being analyzed may be identified.

At block 406, clusters of mobile applications within a category may be determined based on requested permissions of each of the applications. An application may be determined to be in a cluster by a similarity of a score of an applications feature vector of requested permissions with its nearest cluster. One or more different clustering algorithms may be used. According to some embodiments, a K-Means algorithm may be used to determining clustering and prototype or centroid selection. In embodiments using a K-Means Algorithm the computation may be performed a plurality of times and the number of clusters input may be varied from 1 to 5. The iteration with the smallest similarity index may be chosen. According to some embodiments, prototype based hierarchical clustering analysis may be used to determine the clusters. The number of clusters may be dependent upon the data. Prototypes of a cluster may be computed as part of the algorithm. A distance metric may be used to create or calculate clusters (e.g., by determining the distance between bit vectors of permission sets of two applications) during K-means clustering analysis, prototype based hierarchical clustering analysis, or other clustering algorithms.

At block 408, a centroid or prototype of a cluster may be determined. According to some embodiments, this may be determined as part of the clustering determination.

At block 410, a similarity score for an application may be determined. An application under consideration may be analyzed with respect to one or more clusters of applications using a distance metric. A distance metric may use a distance between a bit vector of a permission set of an application being analyzed and a bit vector of a permission set of a prototype or centroid of a nearest cluster. One or more distance measurement algorithms may be used. according to some embodiments, a hamming distance may be calculated. For example, the distance may be calculated as: $D(X,Y)=|X \cup Y|-|X \cap Y|$. According to some embodiments, a normalized Euclidean distance algorithm may be used. According to one more embodiments, a Jaccard distance algorithm may be used. For example, the distance may be calculated as: $D(X,Y)=1-|x \cap Y|/|X \cup Y|$. These distance algorithms may also be used during clustering analysis.

At block 412, an application score may be determined. Once a distance between the requested permission set vector of the application being analyzed and the requested permission set vector of the prototype application of the nearest cluster is calculated, the distance may be the similarity score of the application being analyzed. The similarity score may be converted to an application score. According to some embodiments (e.g., embodiments in which the prototype of the closest cluster is presumed to be a good application), the smaller the similarity score or distance, the higher the application score will be. According to some embodiments (e.g., embodiments in which the prototype of the closest cluster is known to be malware), the larger the similarity score or distance, the higher the application score will be.

At block 414 it may be determined if an application score is below a specified threshold. If an application score is not below a specified threshold the method 400 may end at block 418. If an application score is below a specified threshold, the method 400 may continue at block 416.

At block 416, additional analysis may be performed. For example, static analysis, dynamic analysis, reputation based analysis, or other methods of identifying suspicious applications may be performed. If an application with a low score is found to be legitimate (e.g., perhaps unusual permissions are used for legitimate and safe reasons), the application score may be adjusted. If an application is found to be malware, the score may be lowered, the application may be filtered, blocked, de-listed from an app store or other actions may be performed. A signature of an identified malware application may be collected. The permission feature vector may be used to identify variants of an identified malware application. According to some embodiments, vectors of permission sets may be used to identify malware variants of legitimate applications.

At block 418, the method 400 may end.

At this point it should be noted that identifying suspicious applications in accordance with the present disclosure as described above typically involves the processing of input data and the generation of output data to some extent. This input data processing and output data generation may be implemented in hardware or software. For example, specific electronic components may be employed in a suspicious applications identification module or similar or related circuitry for implementing the functions associated with identifying suspicious applications in accordance with the present disclosure as described above. Alternatively, one or more processors operating in accordance with instructions may implement the functions associated with identifying suspicious applications in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for identifying suspicious applications comprising:

determining one or more clusters of applications in an identified category of applications based on a distance metric measuring distances between requested permissions of each of two or more applications in each of the one or more clusters of applications;

determining a center application of each of the one or more clusters; and determining, using at least one computer processor, a similarity score for an application being evaluated based at least in part on a distance between the application being evaluated and the center application of a closest cluster of the one or more clusters.

2. The method of claim 1, wherein the identified category comprises a category specified by a mobile application distributor for the application being evaluated.

3. The method of claim 1, wherein determining one or more clusters of applications is performed using hierarchical clustering.

4. The method of claim 1, wherein determining one or more clusters of applications is performed using K-means clustering.

5. The method of claim 1, wherein the distance between the application being evaluated and the center application of the closest cluster is computed using a hamming distance.

6. The method of claim 5, wherein the hamming distance is computed between a bit vector of a requested permission set of the application being evaluated and a bit vector of a requested permission set of the center application of the closest cluster.

7. The method of claim 1, wherein the distance between the application being evaluated and the center application of the closest cluster is computed using a Euclidean distance.

8. The method of claim 1, wherein the distance between the application being evaluated and the center application of the closest cluster is computed using a Jaccard distance.

9. The method of claim 1, wherein applications in the one or more clusters of applications in an identified category of applications comprise applications in an online application store.

10. The method of claim 1, wherein the requested permissions of each of the two or more applications in each of the one or more clusters of applications are obtained using a manifest file of each of the two or more applications.

11. The method of claim 1, wherein the requested permissions of each of the two or more applications are filtered prior to determination of a cluster to exclude from consideration permissions which occur in fewer than a specified number of applications.

12. The method of claim 1, further comprising converting the similarity score for the application being evaluated into an application score.

13. The method of claim 12, wherein the application score increases as the similarity score based at least in part on a distance between the application being evaluated and the center application of a closest cluster decreases.

14. The method of claim 12, wherein the conversion of the similarity score to the application score is based at least in part on a clustering algorithm used to determining the one or more clusters of applications.

15. The method of claim 12, wherein the conversion of the similarity score to the application score is based at least in part on a distance algorithm used to determining the distance between the application being evaluated and the center application of the closest cluster of the one or more clusters.

16. The method of claim 12, wherein one or more actions are performed in response to a determination that the application has an application score below a specified threshold.

17. The method of claim 16, wherein one or more actions comprise at least one of: performing static analysis of the application, performing behavioral analysis of the application, performing reputation based analysis of the application, blacklisting the application, and blocking the application.

18. An article of manufacture for identifying suspicious applications, the article of manufacture comprising:
  at least one non-transitory processor readable storage medium; and
  instructions stored on the at least one storage medium;
  wherein the instructions are configured to be readable from the at least one storage medium by at least one processor and thereby cause the at least one processor to operate so as to:
    determine one or more clusters of applications in an identified category of applications based on a distance metric measuring distances between requested permissions of each of two or more applications in each of the one or more clusters of applications;
    determine a center application of each of the one or more clusters; and
    determine a similarity score for an application being evaluated based at least in part on a distance between the application being evaluated and the center application of a closest cluster of the one or more clusters.

19. A system for identifying suspicious applications comprising:
  one or more processors communicatively coupled to a network; wherein the one or more processors are configured to:
    determine one or more clusters of applications in an identified category of applications based on a distance metric measuring distances between requested permissions of each of two or more applications in each of the one or more clusters of applications;
    determine a center application of each of the one or more clusters; and
    determine a similarity score for an application being evaluated based at least in part on a distance between the application being evaluated and the center application of a closest cluster of the one or more clusters.

* * * * *